*A. Dunn,*
*Soap Boiler,*
*N⁰ 1,300.*          *Patented Aug. 23, 1839*
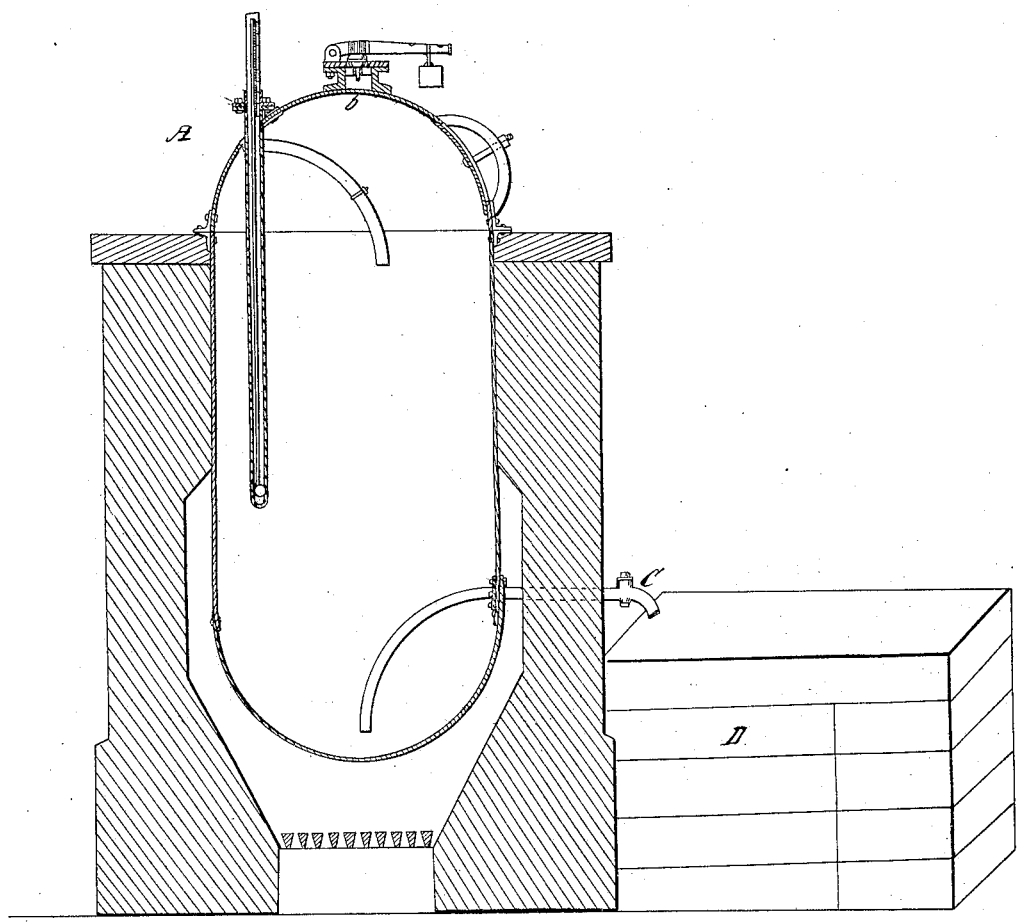

UNITED STATES PATENT OFFICE.

ARTHUR DUNN, OF STAMFORD HILL, COUNTY OF MIDDLESEX, ENGLAND.

IMPROVEMENT IN THE PROCESS OF MANUFACTURING SOAP.

Specification forming part of Letters Patent No. 1,300, dated August 23, 1839; antedated August 24, 1838.

The specification of ARTHUR DUNN, gentleman, of Stamford Hill, in the county of Middlesex, England, of certain Improvements in the Manufacture of Soap—that is to say:

The nature of the said invention consists, first, with reference to soaps generally in boiling or heating the ingredients of which they are to be composed or manufactured in close or covered steam-tight vessels, so that the saponifying process may be performed under steam-pressure and at temperatures exceeding the ordinary boiling-points of the aforesaid ingredients when they are mixed together and exposed to heat in open vessels in the ordinary process of soap-boiling, and, secondly, with reference to those soaps in particular of which silica is to form a component part my invention consists in placing silica or materials containing silica in the high-pressure boiler with the other ingredients, as hereinafter stated, or in dissolving silica with caustic alkaline lees in a steam-tight vessel or digester at a high temperature and under steam-pressure, and thus producing a silicate which may be mixed afterward with the ingredients hereinbefore alluded to, (when required to make silica soap,) as hereinafter described, and whereas the manner in which the said invention is to be performed is as follows:

I take the ingredients for making soap and in the usual proportion—say, for instance, in order to make common yellow soap seven hundred-weight of tallow, three hundred-weight of palm-oil, three hundred-weight of resin, and about one hundred and forty to one hundred and fifty gallons of caustic-soda lees, specific gravity about 1.16, or containing 11.5 per cent. of real soda, and place the whole in a steam-boiler, such as shown in the drawings. The boiler should be furnished with a man-hole $a$, safety-valve $b$, and all the ordinary appendages of such an apparatus, with a thermometer plunged in a mercury-chamber $c$. There should be a feed-pipe, as at A, and a discharge-pipe, as at C, through which the soap may be discharged into a pan or frame, as at D. The fire being lighted, the pressure on the valve should be such as to allow the temperature in the boiler to rise gradually to about 310° Fahrenheit. When it has remained at this height for about one hour, the ingredients may be discharged from the boiler into the pan or frame and allowed to cool down, when the process of saponification will be found to have taken place.

I will now proceed to describe the manner in which I dissolve the silica when I am about to make silica soap with silica in that state, and which I do previous to adding it to the other ingredients, whereby I am enabled to determine the quantity of silica to be contained in the soap, or sufficiently so for all practical purposes. This which constitutes my second head of improvement consists simply in putting silica, whether in the state of ordinary black flints broken to the size of half a cubic inch, or thereabout, or in combination with other substances, with caustic alkaline lees in the proportion of about one hundred-weight of silica to one hundred gallons lees of the specific gravity of about 1.16 in a steam-tight boiler with apparatus such as hereinbefore described and heating the same to a temperature above the ordinary boiling-point of such lees, (say about 310° Fahrenheit,) keeping the ingredients under steam-pressure of about fifty or seventy pounds on the square inch for about three or four hours, when it is discharged and cooled down, and I obtain a silicate of soda or potash, according to the alkali used in solution, the strength of which can be ascertained by chemical analysis, and this solution when silica soap is to be made may be added in any quantity to the other ingredients when in the pan or frame, after they have undergone the saponifying process before described and before they cool down, dependent on the percentage of silica required to be in the soap.

Now whereas I claim as my invention—

1. Performing the saponifying process of soap-making by heating the ingredients of which the soap is to be composed in a steam-tight boiler, as aforesaid, at the increased temperature aforesaid, and under pressure, as aforesaid.

2. Digesting silica in a similar boiler at a high temperature and under pressure, as aforesaid, and then mixing it with the other ingredients in the pan or frame, as aforesaid, whereby I am enabled in the first case to cause the perfect combination of the ingredients required for making soap in a much shorter time with less waste and at a less expense than heretofore, and in the second case to cause silica to combine more readily with soap and to ascertain more accurately the quantity of silica to be contained in silica soap; but I disclaim the manufacture of silica soap as a new invention, and only claim the mode of manufacturing the same, as hereinbefore mentioned.

ARTHUR DUNN.

Witnesses:
 WM. ELLIOTT,
*Clerk to W. Taylor, Sol., Furnival's Inn.*
 JAMES M. CURLEY,
*Clerk in the Consulate of the United States, London.*